United States Patent

Nabeya et al.

(10) Patent No.: US 12,358,096 B2
(45) Date of Patent: Jul. 15, 2025

(54) RUBBER MEMBRANE HAVING FIRST AND SECOND HARDNESS FOR USE IN A POLISHING HEAD

(71) Applicant: EBARA CORPORATION, Tokyo (JP)

(72) Inventors: Osamu Nabeya, Tokyo (JP); Shingo Togashi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 357 days.

(21) Appl. No.: 17/895,925

(22) Filed: Aug. 25, 2022

(65) Prior Publication Data

US 2023/0065029 A1 Mar. 2, 2023

(30) Foreign Application Priority Data

Sep. 1, 2021 (JP) .................................. 2021-142190

(51) Int. Cl.
*B24B 37/26* (2012.01)
*B24B 37/04* (2012.01)
*B24B 37/24* (2012.01)

(52) U.S. Cl.
CPC .............. *B24B 37/26* (2013.01); *B24B 37/04* (2013.01); *B24B 37/24* (2013.01)

(58) Field of Classification Search
CPC ......... B24B 37/26; B24B 37/04; B24B 37/24; B24B 37/30; B24B 37/34
See application file for complete search history.

(56) References Cited

FOREIGN PATENT DOCUMENTS

| JP | H03-182809 A | 8/1991 | |
|---|---|---|---|
| JP | 2006-159392 A | 6/2006 | |
| JP | 2010-274415 A | 12/2010 | |
| JP | 2013-111717 A | 6/2013 | |
| JP | 2013-244652 A | 12/2013 | |
| JP | 2018-182064 A | 11/2018 | |
| JP | 2021-122896 A | 8/2021 | |
| WO | WO-0187541 A2 * | 11/2001 | ............. B24B 37/30 |

\* cited by examiner

*Primary Examiner* — C. A. Rivera
(74) *Attorney, Agent, or Firm* — BakerHostetler

(57) ABSTRACT

An elastic membrane having a physical property required for each portion of the elastic membrane and capable of uniformly polishing a workpiece is disclosed. The elastic membrane includes: a contact portion having a workpiece pressing surface for pressing a workpiece against a polishing surface; and a partition wall extending upward from the contact portion and forming a pressure chamber. The contact portion and at least a part of the partition wall are composed of a first rubber structure and a second rubber structure which are integrally formed, the first rubber structure has a first hardness, and the second rubber structure has a second hardness lower than the first hardness, the first rubber structure includes the workpiece pressing surface, and the second rubber structure includes the at least a part of the partition wall.

8 Claims, 10 Drawing Sheets

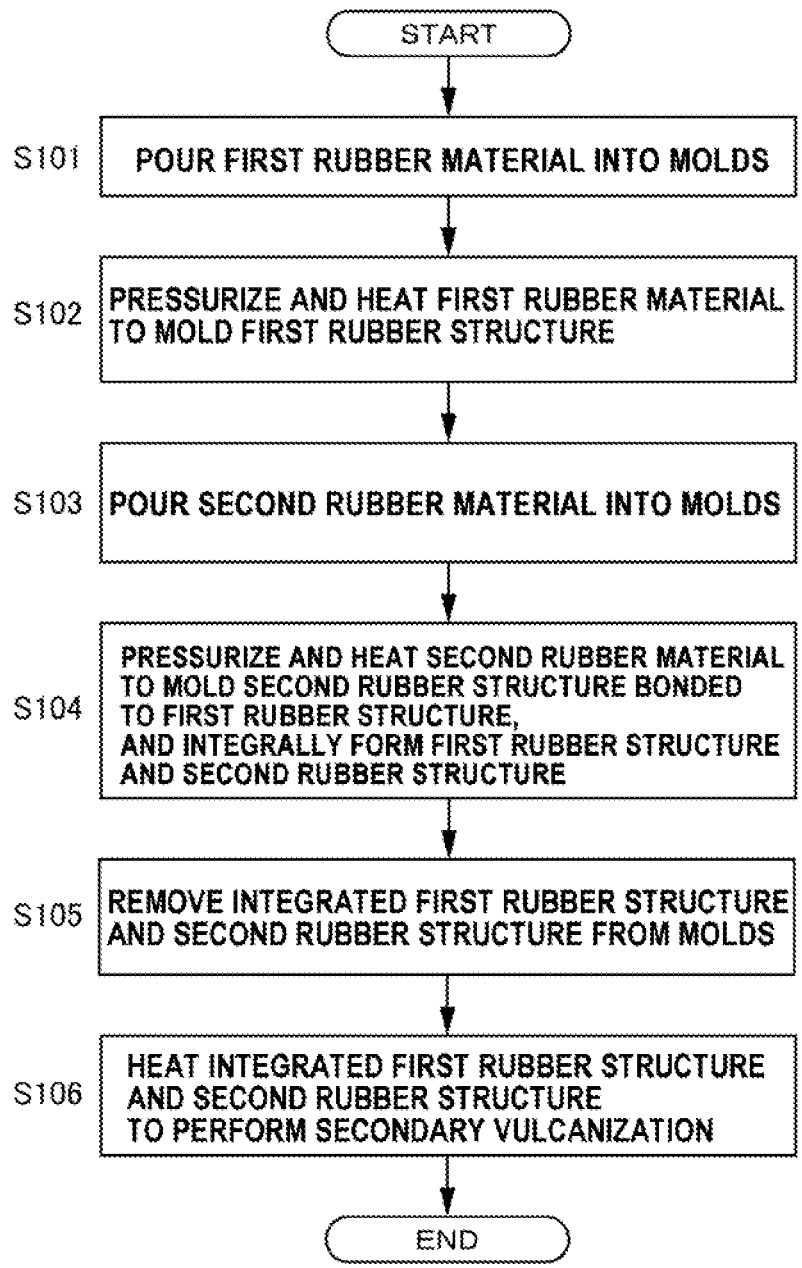

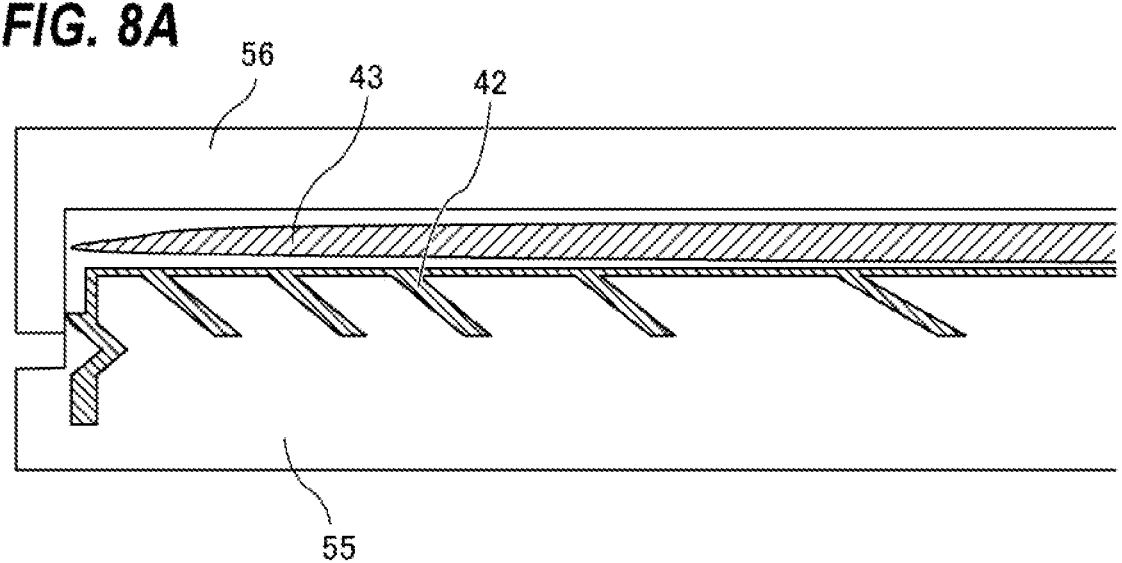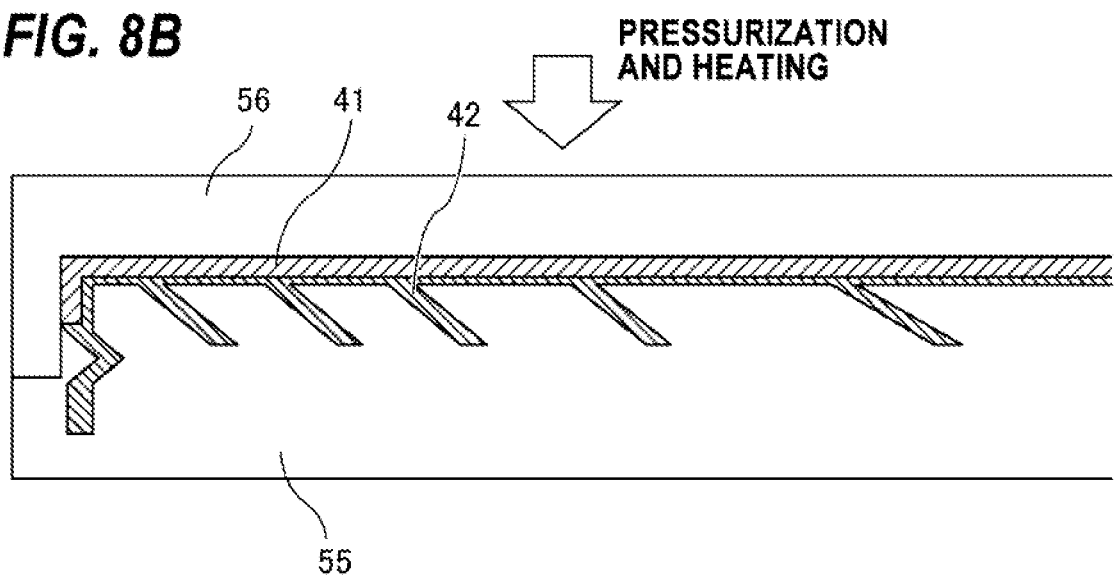

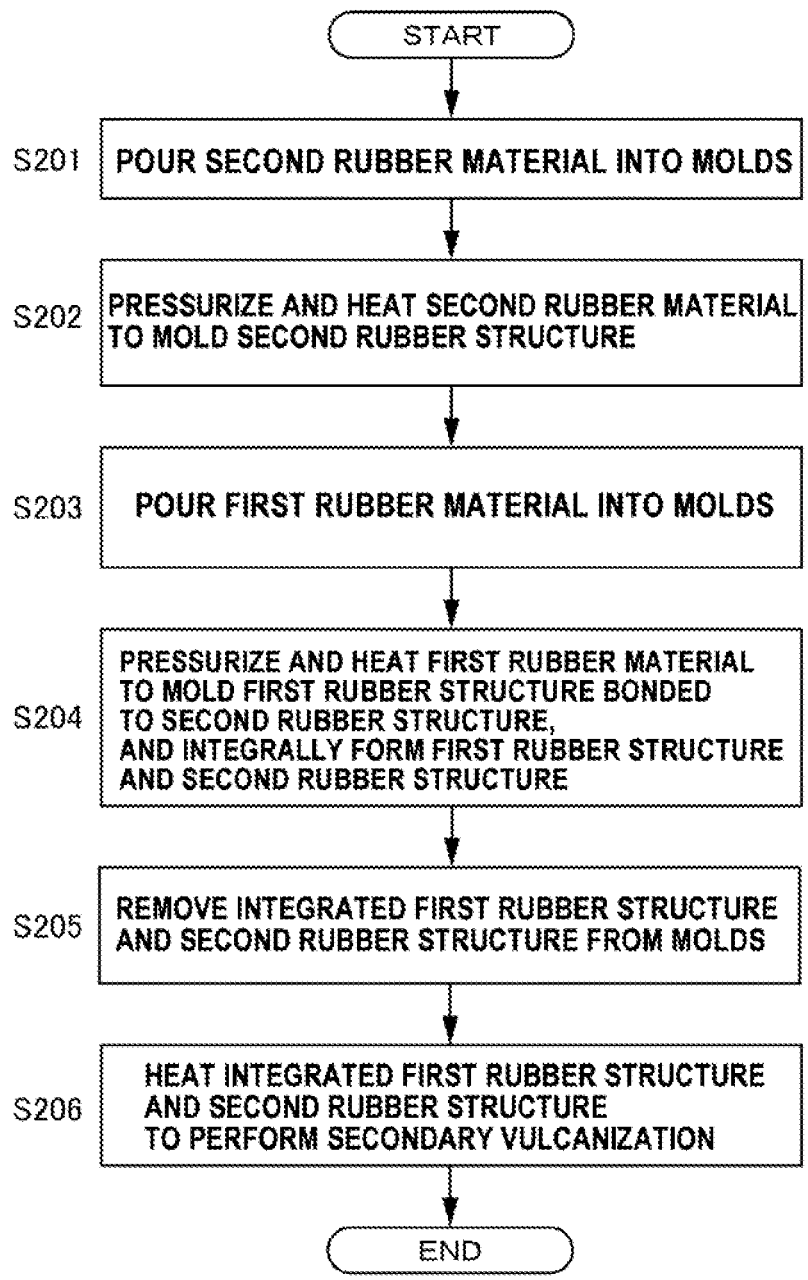

RUBBER MEMBRANE HAVING FIRST AND SECOND HARDNESS FOR USE IN A POLISHING HEAD

CROSS REFERENCE TO RELATED APPLICATION

This application claims priority to Japanese Patent Application No. 2021-142190 filed Sep. 1, 2021, the entire contents of which are hereby incorporated by reference.

BACKGROUND

Chemical mechanical polishing (CMP) is known as a technique in the manufacturing process of semiconductor devices. The chemical mechanical polishing (CMP) is a technique of polishing a workpiece by bringing the workpiece into sliding contact with a polishing surface of a polishing pad while supplying a polishing liquid containing abrasive grains, such as silica ($SiO_2$), onto the polishing surface. A polishing apparatus for performing the CMP includes a polishing table configured to support the polishing pad having the polishing surface, and a polishing head for pressing the workpiece against the polishing pad.

The polishing head is configured to press the workpiece against the polishing pad by an elastic membrane forming a pressure chamber. A pressurized gas is supplied into the pressure chamber, and a pressure of the gas is applied to the workpiece via the elastic membrane. Therefore, a force with which the workpiece is pressed against the polishing pad can be regulated by the pressure in the pressure chamber. In order to efficiently transmit the pressure of the gas to the workpiece and press the workpiece with an appropriate force from a center to an edge of the workpiece, a flexible material, such as rubber, is generally used for the elastic membrane.

Generally, the workpiece is required to have a uniform film-thickness distribution over the entire surface of the workpiece. Thus, an elastic membrane forming a plurality of concentric pressure chambers has been conventionally used. If initial film thicknesses along a radial direction of the workpiece varies, a polishing rate (also referred to as a removal rate) along the radial direction of the workpiece can be adjusted by regulating the pressure in the plurality of pressure chambers.

FIG. 10 is a cross-sectional view showing a part of a polishing head 105 including an elastic membrane 130 forming a plurality of pressure chambers C1 to C6. The elastic membrane 130 includes a contact portion 131 having a workpiece pressing surface 131a that contacts a workpiece W, and partition walls 132 to 137 that extends upward from the contact portion 131 and form the pressure chambers C1 to C6.

The partition wall 132 is located on the outermost side of the contact portion 131, and may also be referred to as a side wall. When gas is supplied to the pressure chamber C1 and the partition wall 132 contacts with a retainer ring 128, a pressing force on the workpiece W may vary in a circumferential direction of the workpiece W. Therefore, the partition wall 132 is required to have rigidity so as not to incline outward so that the partition wall 132 is prevented from contacting with the retainer ring 128 due to a deformation of the elastic membrane 130. On the other hand, the partition wall 132 is required to have flexibility so as to expand downward when the gas is supplied to the pressure chamber C1.

The partition walls 133 to 137 located inwardly of the partition wall 132 are required to have flexibility so as to expand downward when the gas is supplied to the pressure chambers C2 to C6. If the flexibility of the partition walls 133 to 137 is not sufficient, the workpiece pressing surface 131a is pulled up at connecting portions between the contact portion 131 and the partition walls 133 to 137 as shown in FIG. 10. As a result, the pressing force on the workpiece W may be locally lowered.

The contact portion 131 is required to have an appropriate rigidity such that the contact portion 131 does not twist during polishing of the workpiece W, the contact portion 131 is not easily worn due to friction with the workpiece W, and the workpiece W is easily detached from the contact portion 131 after the polishing of the workpiece W. In order to achieve the uniform film-thickness distribution of the workpiece, the appropriate rigidity and flexibility are required for each portion of the elastic membrane according to a function thereof.

Japanese laid-open patent publication No. 2010-274415 describes a technique of providing a diaphragm on a substrate-holding-surface side of an elastic membrane to smooth a gradient of a polishing pressure (or polishing speed) at a boundary between two adjacent regions (or areas). Japanese laid-open patent publication No. 2013-111717 describes a technique of reducing a contact between an elastic membrane and a retainer ring, and preventing a contact portion from sagging and a contact surface from wrinkling by reinforcing the contact portion of an elastic membrane with a resin plate or a thread-like member. However, these techniques require providing a member other than an elastic material constituting the elastic membrane.

SUMMARY

Thus, there is provided an elastic membrane having a physical property required for each portion of the elastic membrane and capable of uniformly polishing a workpiece. There is further provided a method of manufacturing such an elastic membrane.

Embodiments, which will be described below, relate to an elastic membrane for use in a polishing head for polishing a workpiece, such as a wafer, a substrate, or a panel, used for manufacturing semiconductor devices, and a method of manufacturing the elastic membrane.

In one embodiment, there is provided an elastic membrane for use in a polishing head for polishing a workpiece and for pressing the workpiece against a polishing surface, comprising: a contact portion having a workpiece pressing surface for pressing the workpiece against the polishing surface; and a partition wall extending upward from the contact portion and forming a pressure chamber, wherein the contact portion and at least a part of the partition wall are composed of a first rubber structure and a second rubber structure which are integrally formed, the first rubber structure has a first hardness, and the second rubber structure has a second hardness lower than the first hardness, the first rubber structure includes the workpiece pressing surface, and the second rubber structure includes the at least a part of the partition wall.

In one embodiment, the partition wall is connected to an outer edge of the contact portion, the first rubber structure includes at least a part of a lower portion of the partition wall, and the second rubber structure includes an upper portion of the partition wall.

In one embodiment, the upper portion of the partition wall has a bent portion configured to be expandable and contractible.

In one embodiment, the partition wall has a first partition wall and a second partition wall forming a plurality of pressure chambers, the first partition wall is connected to an outer edge of the contact portion, the second partition wall is located inwardly of the first partition wall, and the second rubber structure includes the second partition wall.

In one embodiment, the first rubber structure includes at least a part of a lower portion of the first partition wall, and the second rubber structure includes an upper portion of the first partition wall.

In one embodiment, the upper portion of the first partition wall has a bent portion configured to be expandable and contractible.

In one embodiment, the first rubber structure and the second rubber structure have irregularities on surfaces that constitute an interface between the first rubber structure and the second rubber structure.

In one embodiment, there is provided a method of manufacturing an elastic membrane for use in a polishing head for polishing a workpiece and for pressing the workpiece against a polishing surface, said method comprising: molding one of a first rubber structure having a first hardness and a second rubber structure having a second hardness lower than the first hardness; and integrally forming the first rubber structure and the second rubber structure by molding other of the first rubber structure and the second rubber structure and bonding the first rubber structure and the second rubber structure to each other, the elastic membrane including: a contact portion having a workpiece pressing surface for pressing the workpiece against the polishing surface; and a partition wall extending upward from the contact portion and forming a pressure chamber, wherein the first rubber structure includes the workpiece pressing surface, and the second rubber structure includes at least a part of the partition wall.

In one embodiment, the method of manufacturing the elastic membrane further comprises: secondary vulcanization process of heating the first rubber structure and the second rubber structure which are integrally molded.

In one embodiment, the method of manufacturing the elastic membrane further comprises: in molding of the first rubber structure or in molding of the second rubber structure, forming irregularities on surfaces that constitute an interface between the first rubber structure and the second rubber structure.

According to the above-described embodiments, a uniform film-thickness distribution of the workpiece can be achieved by polishing the workpiece using the elastic membrane integrally formed at least two rubber structures having appropriate different hardness for each portion.

BRIEF DESCRIPTION OF THE DRAWINGS

FIG. 6 is a flowchart of the manufacturing method shown in FIGS. 4A to 4C and FIGS. 5A to 5B;
FIGS. 8A and 8B are diagrams illustrating a continuation of FIG. 7C;
FIG. 9 is a flowchart of the method of manufacturing shown in FIGS. 7A to 7C and FIGS. 8A to 8B.

DESCRIPTION OF EMBODIMENTS

Embodiments will now be described with reference to the drawings.

Figure 1:
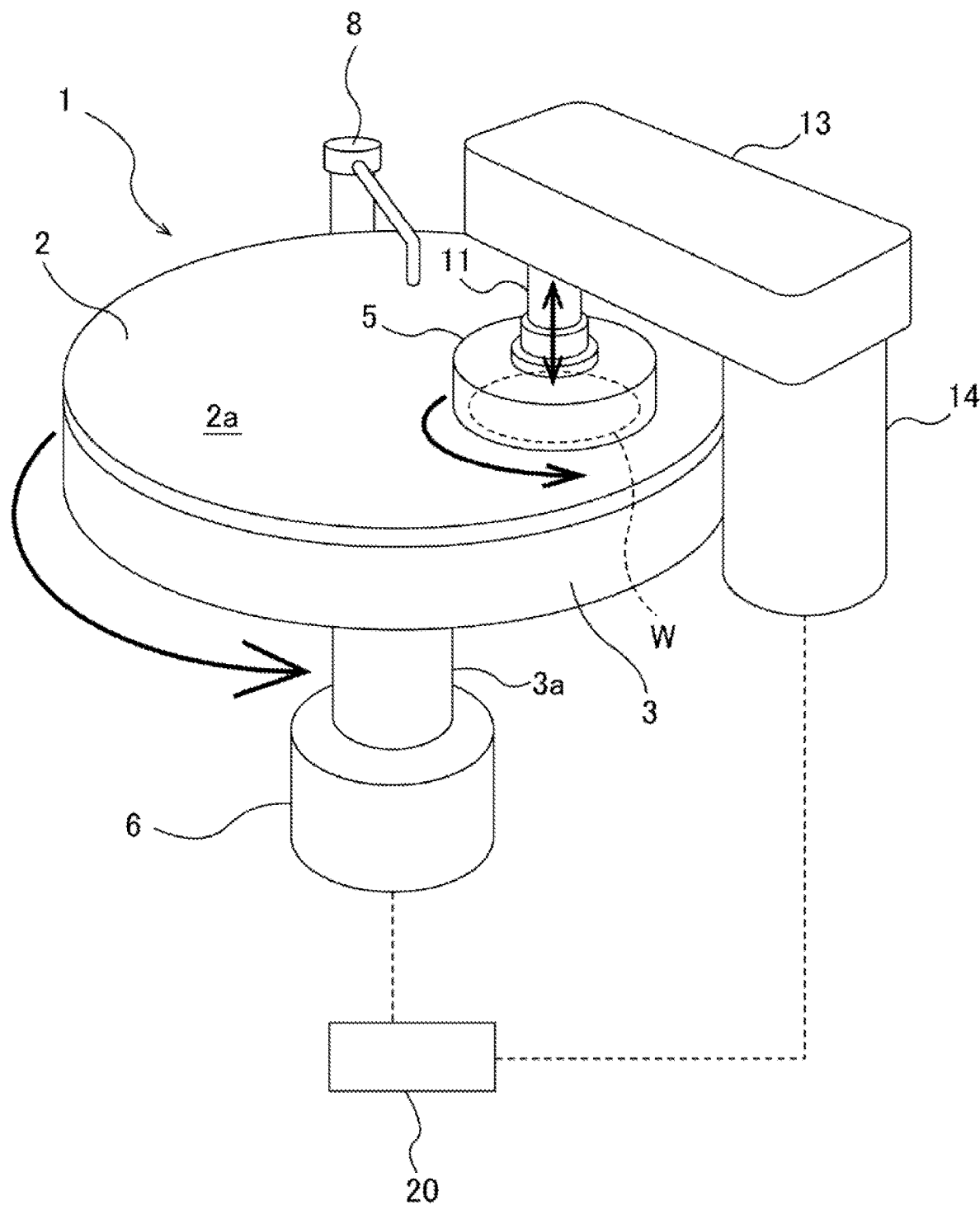
FIG. 1 is a diagram showing an embodiment of a polishing apparatus.

FIG. 1 is a diagram showing an embodiment of a polishing apparatus 1. The polishing apparatus 1 is an apparatus for chemically and mechanically polishing a workpiece W, such as a wafer, a substrate, or a panel, used for manufacturing semiconductor devices. As shown in FIG. 1, the polishing apparatus 1 includes a polishing table 3 configured to support a polishing pad 2 having a polishing surface 2a, a polishing head 5 configured to press the workpiece W against the polishing surface 2a, and a polishing-liquid supply nozzle 8 configured to supply a polishing liquid onto the polishing surface 2a.

The polishing table 3 is coupled to a table motor 6, which disposed below the polishing table 3, via a table shaft 3a. The table motor 6 is configured to rotate the polishing table 3 and the polishing pad 2 together in a direction indicated by an arrow. A surface of the polishing pad 2 constitutes the polishing surface 2a for polishing the workpiece W.

The polishing head 5 is configured to be able to hold the workpiece W on its lower surface. The polishing head 5 is fixed to an end portion of a polishing-head shaft 11, and the polishing-head shaft 11 is rotatably supported by a head oscillation arm 13. The head oscillation arm 13 is rotatably supported by a support shaft 14. The polishing-head shaft 11 is coupled to a polishing-head motor (not shown). The polishing-head motor is configured to rotate the polishing head 5 together with the polishing-head shaft 11 in a direction indicated by an arrow.

The polishing-head shaft 11 is further coupled to a polishing-head vertically moving mechanism (not shown). The polishing-head vertically moving mechanism is configured to vertically move the polishing-head shaft 11 and the polishing head 5 relative to the head oscillation arm 13.

The polishing apparatus 1 further includes an operation controller 20 configured to control operations of the polishing head 5, the table motor 6, the polishing-head motor, the polishing-head vertically moving mechanism, and the polishing-liquid supply nozzle 8. The operation controller 20 is composed of at least one computer.

Polishing of the workpiece W is performed as follows. While the polishing table 3 and the polishing head 5 are rotated in the directions indicated by the arrows in FIG. 1, the polishing liquid is supplied from the polishing-liquid supply nozzle 8 onto the polishing surface 2a of the polishing pad 2 on the polishing table 3. While the workpiece W is rotated by the polishing head 5, the workpiece W is pressed against the polishing surface 2a of the polishing pad 2 by the polishing head 5 in the presence of the polishing liquid between the polishing pad 2 and the workpiece W. A surface of the workpiece W is polished by a combination of a chemical action of the polishing liquid and mechanical action(s) of abrasive grains contained in the polishing liquid and/or the polishing pad 2.

Figure 2:
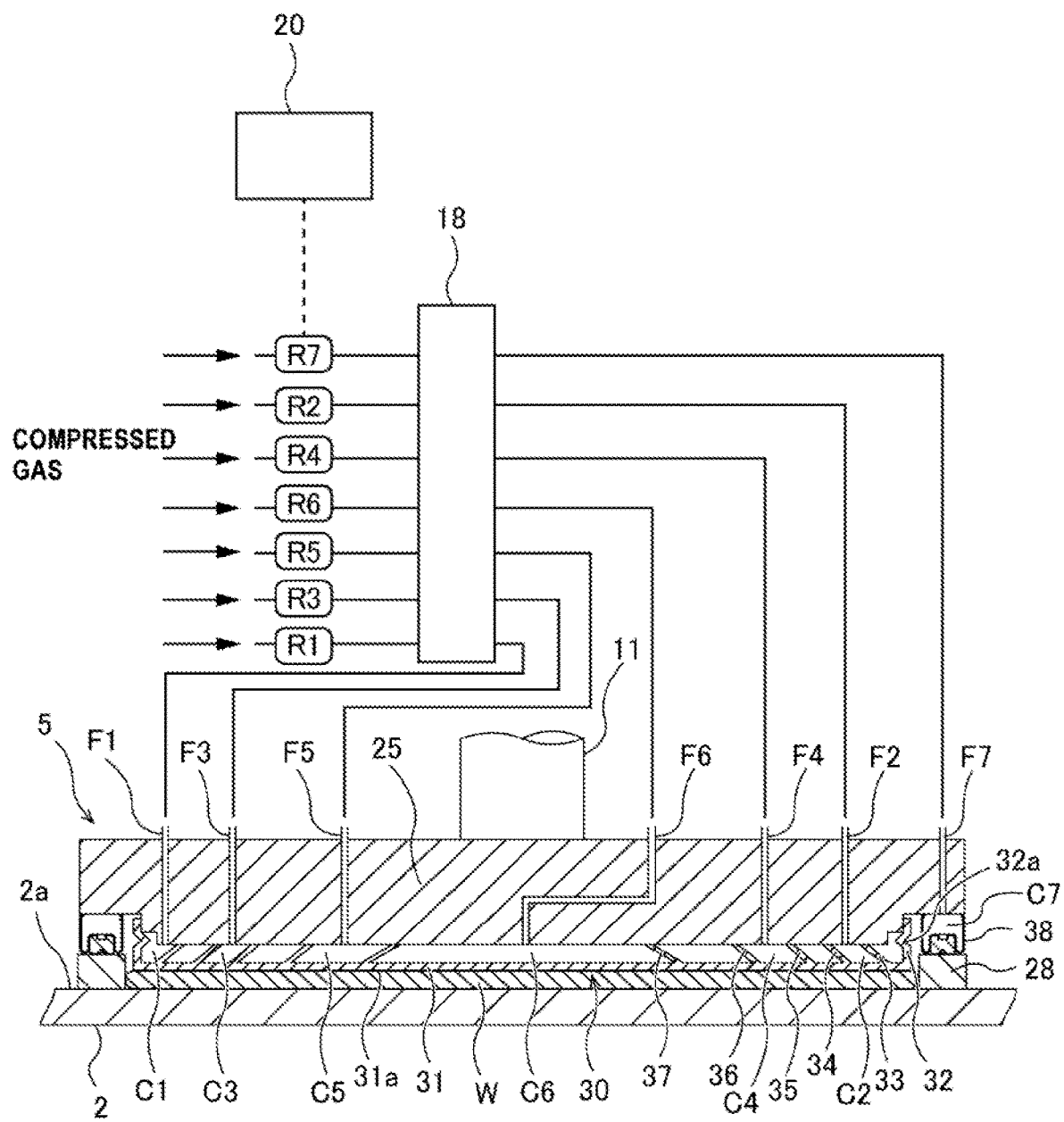
FIG. 2 is a cross-sectional view showing an embodiment of a polishing head.

Next, the polishing head 5 will be described. FIG. 2 is a cross-sectional view showing an embodiment of the polishing head 5. The polishing head 5 includes a carrier 25 fixed to the end portion of the polishing-head shaft 11, an elastic membrane 30 attached to a lower portion of the carrier 25, and a retainer ring 28 arranged below the carrier 25. The retainer ring 28 is arranged around the elastic membrane 30. The retainer ring 28 is an annular structure configured to retain the workpiece W so as not to allow the workpiece W to come out of the polishing head 5 during the polishing of the workpiece W.

The elastic membrane 30 includes a contact portion 31 having a workpiece pressing surface 31a being contactable with an upper surface of the workpiece W, and partition walls 32 to 37 extending upward from the contact portion 31. The contact portion 31 has substantially the same size and the same shape as those of the upper surface of the workpiece W. The partition walls 32 to 37 are endless walls concentrically arranged. The first partition wall 32 is an outermost partition wall. The first partition wall 32 may also be referred to as a side wall.

More specifically, the partition walls 32 to 37 are the first partition wall 32 connected to an outer edge of the contact portion 31, the second partition wall 33 located inwardly of the first partition wall 32, the third partition wall 34 located inwardly of the second partition wall 33, the fourth partition wall 35 located inwardly of the third partition wall 34, the fifth partition wall 36 located inwardly of the fourth partition wall 35, and the sixth partition wall 37 located inwardly of the fifth partition wall 36. The first partition wall 32 has, in its upper portion, a bent portion 32a configured to be expandable and contractible. The second partition wall 33 to the sixth partition wall 37 extend obliquely upward from the contact portion 31 in a radially inward direction.

Shapes of the first partition wall 32 to the sixth partition wall 37 are not limited to the present embodiment. In one embodiment, the first partition wall 32 may extend upward from the contact portion 31 without having the bent portion 32a, or may branch into a plurality of portions from a lower portion extending upward from the contact portion 31. In one embodiment, the second partition wall 33 to the sixth partition wall 37 may extend upward from the contact portion 31 without inclining, or may be bent in their lower portions extending upward from the contact portion 31.

Six pressure chambers C1 to C6 are provided between the elastic membrane 30 and the carrier 25. The pressure chambers C1 to C6 are formed by at least the contact portion 31 and the partition walls 32 to 37 of the elastic membrane 30. The pressure chamber C1 is located between the first partition wall 32 and the second partition wall 33, the pressure chamber C2 is located between the second partition wall 33 and the third partition wall 34, the pressure chamber C3 is located between the third partition wall 34 and the fourth partition wall 35, the pressure chamber C4 is located between the fourth partition wall 35 and the fifth partition wall 36, the pressure chamber C5 is located between the fifth partition wall 36 and the sixth partition wall 37, and the pressure chamber C6 is located inwardly of the sixth partition wall 37. The pressure chambers C1 to C5 have annular shapes, while the central pressure chamber C6 has a circular shape. These pressure chambers C1 to C6 are concentrically arranged. In one embodiment, the pressure chambers C1 to C6 may have other shapes.

In the present embodiment, the elastic membrane 30 forms the six pressure chambers C1 to C6, while the present invention is not limited to the present embodiment. In one embodiment, the elastic membrane 30 may form less than six pressure chambers or more than six pressure chambers. In one embodiment, less than six partition walls may be provided, or more than six partition walls may be provided. For example, only the first partition wall 32 may be provided, and the elastic membrane 30 may form only one pressure chamber C1.

Gas delivery lines F1, F2, F3, F4, F5, and F6 are coupled to the pressure chambers C1, C2, C3, C4, C5, and C6, respectively. Ends of the gas delivery lines F1 to F6 are coupled to a compressed-gas supply source (not shown) which is a utility supply source provided in a factory where the polishing apparatus 1 is installed. Compressed gas, such as compressed air, is supplied to the pressure chambers C1, C2, C3, C4, C5, and C6 through the gas delivery lines F1, F2, F3, F4, F5, and F6, respectively.

An annular rolling diaphragm 38 is arranged between the carrier 25 and the retainer ring 28, and a pressure chamber C7 is formed inside of the rolling diaphragm 38. The pressure chamber C7 is coupled to the compressed-gas supply source through a gas delivery line F7. The compressed gas is supplied into the pressure chamber C7 through the gas delivery line F7, so that the pressure chamber C7 presses the retainer ring 28 against the polishing surface 2a of the polishing pad 2.

The gas delivery lines F1 to F7 extend via a rotary joint 18 attached to the polishing-head shaft 11. Pressure regulators R1, R2, R3, R4, R5, R6, and R7 are mounted to the gas delivery lines F1, F2, F3, F4, F5, F6, and F7 communicating with the pressure chambers C1, C2, C3, C4, C5, C6, and C7, respectively. The compressed gas from the compressed-gas supply source is independently supplied into the pressure chambers C1 to C7 through the pressure regulators R1 to R7. The pressure regulators R1 to R7 are configured to regulate the pressures of the compressed gas in the pressure chambers C1 to C7.

The pressure regulators R1 to R7 can change the internal pressures of the pressure chambers C1 to C7 independently, so that the pressure regulators R1 to R7 can independently regulate the pressing forces on corresponding six regions of the workpiece W and on the retainer ring 28 against the polishing pad 2. A region of the workpiece W corresponding to the pressure chamber C1 is an annular portion including an edge of the workpiece W. A region of the workpiece W corresponding to the pressure chamber C2 is an annular portion located inwardly of the region of the workpiece W corresponding to the pressure chamber C1. A region of the workpiece W corresponding to the pressure chamber C3 is an annular portion located inwardly of the region of the workpiece W corresponding to the pressure chamber C2. A region of the workpiece W corresponding to the pressure chamber C4 is an annular portion located inwardly of the region of the workpiece W corresponding to the pressure chamber C3. A region of the workpiece W corresponding to the pressure chamber C5 is an annular portion located inwardly of the region of the workpiece W corresponding to the pressure chamber C4. A region of the workpiece W corresponding to the pressure chamber C6 is a circular portion located inwardly of the region of the workpiece W corresponding to the pressure chamber C5.

The gas delivery lines F1 to F7 are coupled to vent valves (not shown), respectively, so that the pressure chambers C1 to C7 can be ventilated to the atmosphere. The pressure regulators R1 to R7 are coupled to the operation controller 20. The operation controller 20 transmits respective target pressure values of the pressure chambers C1 to C7 to the pressure regulators R1 to R7, and the pressure regulators R1 to R7 operate such that the pressures in the pressure chambers C1 to C7 are maintained at the corresponding target pressure values.

The polishing head 5 can apply independent polishing pressures to the plurality of regions of the workpiece W, respectively. For example, the polishing head 5 can press different regions of the surface of the workpiece W with different polishing pressures against the polishing surface 2a of the polishing pad 2. Therefore, the polishing head 5 can control a film-thickness profile of the workpiece W to achieve a target film-thickness profile.

Figure 3:
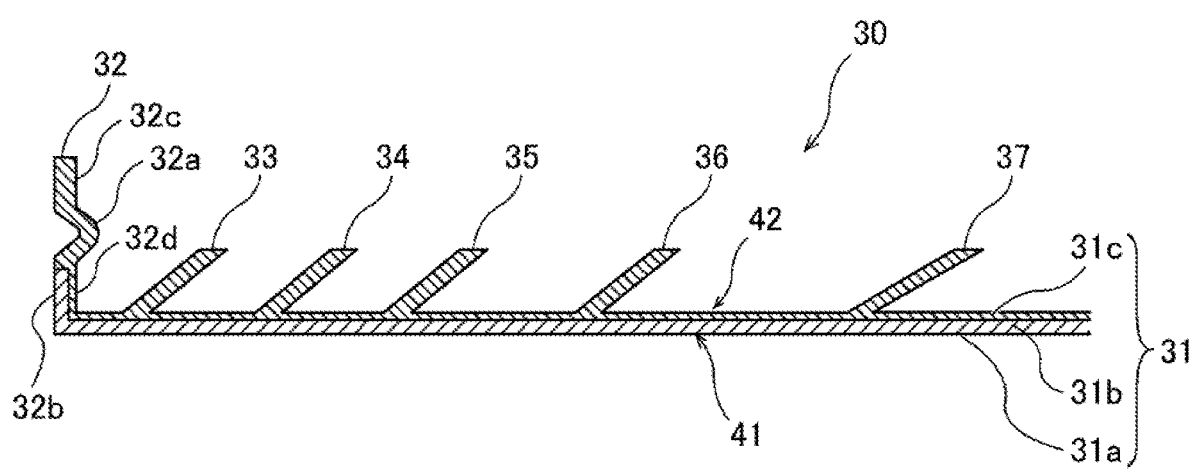
FIG. 3 is a cross-sectional view showing an embodiment of an elastic membrane.

FIG. 3 is a cross-sectional view showing an embodiment of the elastic membrane 30. In FIG. 3, a part of the elastic membrane 30 is shown. The elastic membrane 30 includes a first rubber structure 41 and a second rubber structure 42 which are made of rubbers having different hardness. More specifically, the elastic membrane 30 has the first rubber structure 41 having a first hardness and the second rubber structure 42 having a second hardness lower than the first hardness. The first rubber structure 41 and the second rubber structure 42 constitute an integral structure that has been formed integrally. Examples of the elastic rubber constituting the first rubber structure 41 and the second rubber structure 42 include silicone rubber, EPDM (ethylene propylene diene rubber), and fluororubber. In this embodiment, the silicone rubber is used.

The first rubber structure 41 includes a lower contact portion 31b having the workpiece pressing surface 31a. The lower contact portion 31b is a part of the contact portion 31, and more specifically, the lower contact portion 31b is a lower portion of the contact portion 31. The first rubber structure 41 further includes a lower partition wall 32b which is a lower portion of the first partition wall 32. The lower partition wall 32b constitutes an outer side of the lower portion of the first partition wall 32, and extends upward from the lower contact portion 31b. The lower contact portion 31b and the lower partition wall 32b constitute an integral structure.

The second rubber structure 42 includes an upper contact portion 31c, an upper partition wall 32c, an inner wall portion 32d, and the second partition wall 33 to the sixth partition wall 37. The upper contact portion 31c is a part of the contact portion 31, and more specifically, the upper contact portion 31c is an upper part of the contact portion 31 located over the lower contact portion 31b. The upper contact portion 31c is thinner than the lower contact portion 31b. The upper partition wall 32c constitutes an upper portion of the first partition wall 32 and is located over the lower partition wall 32b. The upper partition wall 32c has the bent portion 32a. The inner wall portion 32d constitutes an inner side of the lower portion of the first partition wall 32, and extends upward from the upper contact portion 31c. The inner wall portion 32d is located inside the lower partition wall 32b. The upper contact portion 31c, the upper partition wall 32c, the inner wall portion 32d, and the second partition wall 33 to the sixth partition wall 37 constitute an integral structure.

The first rubber structure 41 and the second rubber structure 42 are integrally formed, and are bonded or joined together to constitute the integral structure without using an adhesive. Surfaces that constitute an interface between the first rubber structure 41 and the second rubber structure 42 may have irregularities in order to improve adhesion. The interface between the first rubber structure 41 and the second rubber structure 42 includes an interface between the lower contact portion 31b and the upper contact portion 31c of the contact portion 31, and an interface between the lower partition wall 32b and the inner wall portion 32d of the first partition wall 32. The irregularities formed on the surfaces that constitute these interfaces can increase a contact area between the first rubber structure 41 and the second rubber structure 42. As a result, the first rubber structure 41 and the second rubber structure 42 are more firmly integrated.

In one embodiment, the second rubber structure 42 may not have the upper contact portion 31c. In this case, the second partition wall 33 to the sixth partition wall 37 of the second rubber structure 42 extend upward from the contact portion 31 of the first rubber structure 41. Further, in one embodiment, the second rubber structure 42 may not have the inner wall portion 32d. In this case, the upper partition wall 32c extends upward from an upper end of the lower partition wall 32b of the first rubber structure 41.

According to the present embodiment, since the elastic membrane 30 includes the first rubber structure 41 and the second rubber structure 42 having different hardness, the elastic membrane 30 can have appropriate rigidity and flexibility according to a physical property required for each portion of the elastic membrane 30. The first rubber structure 41 has the first hardness, and the second rubber structure 42 has the second hardness. The second hardness is lower than the first hardness. Therefore, the first rubber structure 41 has the appropriate rigidity, and the second rubber structure 42 has the appropriate flexibility. For example, the first hardness is 80 degrees of hardness (by hardness of durometer type A), and the second hardness is 50 degrees of hardness (by hardness of durometer type A), while the present invention is not limited to this example.

The physical properties required for the upper portion and the lower portion of the first partition wall 32 are different. The lower partition wall 32b is required to have an appropriate rigidity so as to prevent the lower partition wall 32b from inclining outward and contacting the retainer ring 28 when the gas is supplied to the pressure chamber C1 (see FIG. 2). Since the lower partition wall 32b is composed of the first rubber structure 41, the lower partition wall 32b has a higher rigidity than that of the second rubber structure 42. Therefore, contact between the lower partition wall 32b and the retainer ring 28 is prevented, and the pressing force against the workpiece W can be made uniform.

The upper partition wall 32c is required to have an appropriate flexibility so as to expand downward when the gas is supplied to the pressure chamber C1. Since the upper partition wall 32c is composed of the second rubber structure 42, the upper partition wall 32c has more flexibility than that of the first rubber structure 41. Therefore, the upper partition wall 32c expands and contracts according to the pressure of the gas supplied to the pressure chamber C1, and the pressing force on the workpiece W can be regulated flexibly. Although the lower partition wall 32b has a relatively high hardness, the pressure in the pressure chamber C1 can be appropriately transmitted to the edge of the workpiece W by the expanding and contracting of the upper partition wall 32c. In particular, in the present embodiment, the bent portion 32a, which is a part of the upper partition wall 32c, can improve an elasticity of the upper partition wall 32c.

The second partition 33 to the sixth partition 37 are required to have flexibility so as to expand downward when the gas is supplied to the pressure chambers C2 to C6 (see FIG. 2). Since the second partition wall 33 to the sixth partition wall 37 are composed of the second rubber structure 42, the second partition wall 33 to the sixth partition wall 37 have more flexibility than that of the first rubber structure 41. Therefore, the second partition wall 33 to the sixth partition wall 37 flexibly expands according to the pressure of the gas supplied to the pressure chambers C2 to C6 (see FIG. 2), so that the elastic membrane 30 can press the workpiece W with appropriate pressing forces.

Since the lower contact portion 31b is composed of the first rubber structure 41, the lower contact portion 31b has a higher rigidity than that of the second rubber structure 42. Therefore, upward deformation of the workpiece pressing surface 31a at connecting portions between the second partition wall 33 to the sixth partition wall 37 and the contact portion 31 can be prevented, and locally lowered pressing force on the workpiece W can be prevented. Further, during the polishing of the workpiece W, the contact portion 31 is prevented from being twisted due to the rotation of the polishing head 5 (see FIG. 1), and the contact portion 31 is not easily worn due to friction with the workpiece W. Furthermore, after the polishing of the workpiece W, the workpiece W does not adhere to the contact portion 31 and easily separates from the contact portion 31.

As described above, using the elastic membrane 30 having different physical property for each portion enables the polishing head 5 to polish the workpiece W with the appropriate pressing forces to achieve a target film-thickness distribution of the workpiece W. Further, since the first rubber structure 41 and the second rubber structure 42 are integrally formed, an adhesive for fixing the first rubber structure 41 and the second rubber structure 42 to each other is not necessary to be used. Therefore, the appropriate rigidity and flexibility for each portion can be achieved without affecting the physical property of the rubber constituting the elastic membrane 30.

Next, a method of manufacturing the elastic membrane 30 will be described. FIGS. 4A to 4C and FIGS. 5A to 5B are diagrams showing an example of the method of manufacturing the elastic membrane 30. In the manufacturing method shown in FIGS. 4A to 4C and FIGS. 5A to 5B, the first rubber structure 41 is first molded, then the second rubber structure 42 is molded, whereby the first rubber structure 41 and the second rubber structure 42 are integrally formed.

Figure 4A:
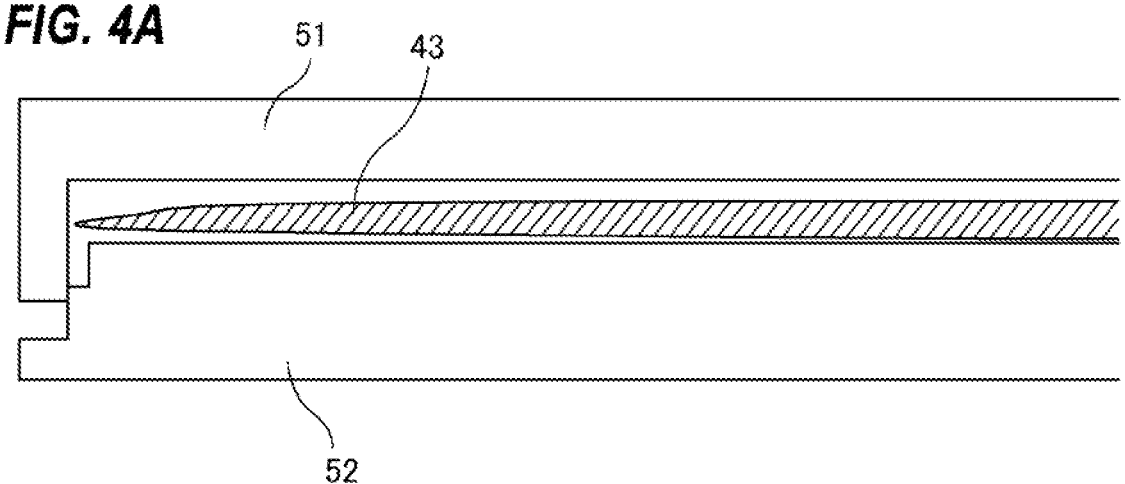
FIGS. 4A to 4C are diagrams showing an example of a method of manufacturing the elastic membrane.
Figure 4B:
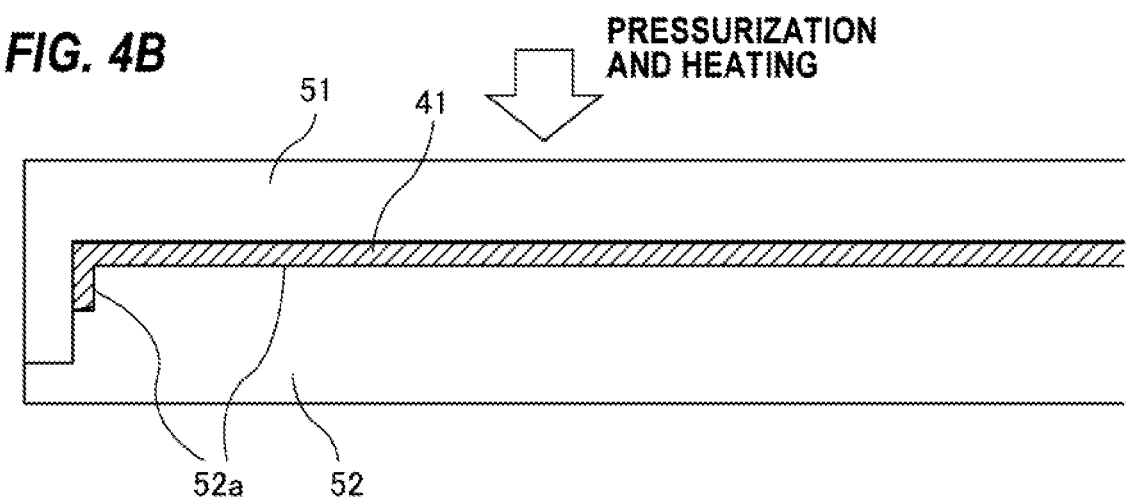

First, as shown in FIG. 4A, a first rubber material 43, which is a material of the first rubber structure 41, is poured into a space between a first mold 51 and a second mold 52. Next, as shown in FIG. 4B, the first mold 51 and the second mold 52 are fitted to pressurize the first rubber material 43, until the first rubber material 43 fills a gap between the first mold 51 and the second mold 52. The first rubber material 43 are heated under pressure applied by the first mold 51 and the second mold 52, so that the first rubber structure 41 is molded.

In order to form the irregularities on the surfaces that constitute the interface between the first rubber structure 41 and the second rubber structure 42, the second mold 52 may have irregularities on a surface 52a contacting the first rubber material 43. As an example, the irregularities may be formed by a surface-roughening process, such as embossing or blasting. The irregularities of the surface 52a can form irregularities on a surface of the lower contact portion 31b (see FIG. 3) of the first rubber structure 41 and a surface of the lower partition wall 32b (see FIG. 3) of the first rubber structure 41, which are to constitute the interface with the second rubber structure 42. Since the irregularities are formed on the surface of the first rubber structure 41, the contact area between the first rubber structure 41 and the second rubber structure 42 increases, and as a result, the first rubber structure 41 and the second rubber structure 42 can be more firmly integrated.

Figure 4C:
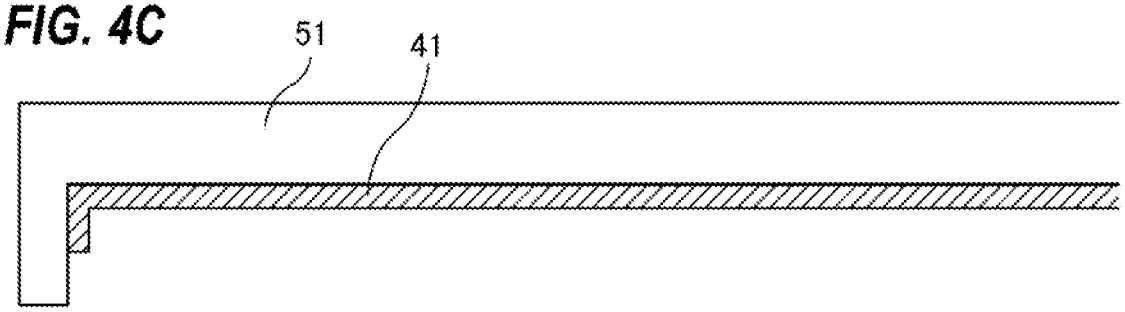

As shown in FIG. 4C, the molded first rubber structure 41 is held on the first mold 51 by a known way, such as vacuum suction, and the second mold 52 is removed. In FIG. 4C, a configuration of the vacuum suction mechanism is omitted. Next, a process of molding the second rubber structure 42 will be described.

Figure 5A:
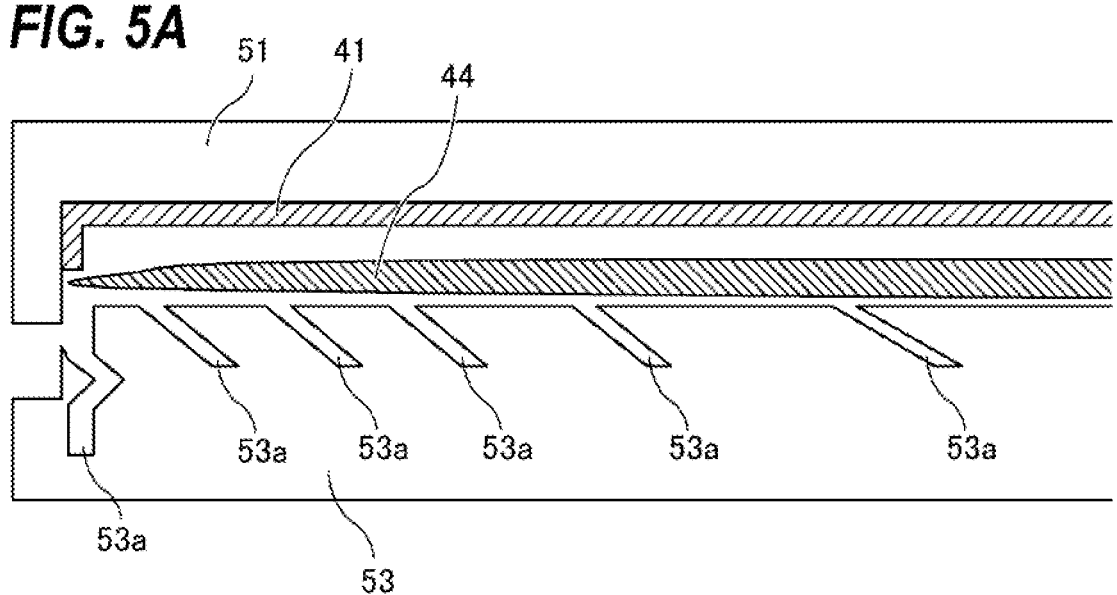
FIGS. 5A and 5B are diagrams illustrating a continuation of FIG. 4C.

As shown in FIG. 5A, a second rubber material 44, which is a material of the second rubber structure 42, is poured into a space between the first mold 51 holding the first rubber structure 41 and a third mold 53. The third mold 53 has recesses 53a for molding the partition walls 32 to 37 (see FIG. 3).

Figure 5B:
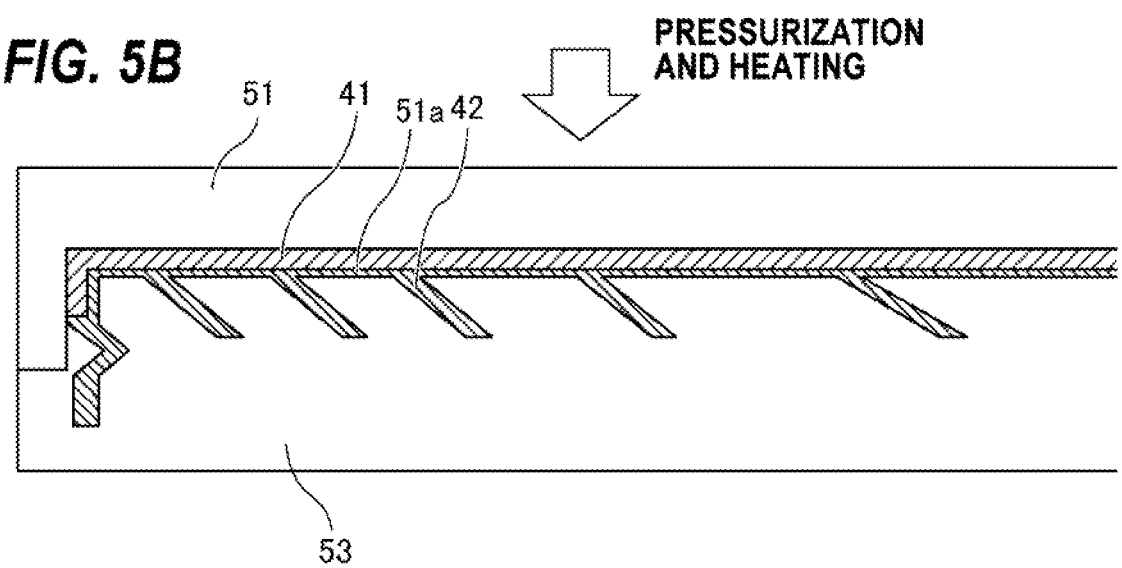

Next, as shown in FIG. 5B, the first mold 51 and the third mold 53 are fitted to pressurize the second rubber material 44, until the second rubber material 44 fills the recesses 53a of the third mold 53. When the first mold 51 and the third mold 53 are fitted, there is a gap Ma of about 0.5 mm between the first rubber structure 41 held by the first mold 51 and the third mold 53. The upper contact portion 31c (see FIG. 3) of the second rubber structure 42 is molded in this gap 51a. The second rubber material 44 is heated under pressure applied by the first mold 51 and the third mold 53, so that the second rubber structure 42 bonded or joined to the first rubber structure 41 is molded. As a result, the first rubber structure 41 and the second rubber structure 42 are integrally formed.

Thereafter, the integrated first rubber structure 41 and second rubber structure 42 is taken out from the first mold 51 and the third mold 53. The third mold 53 may be configured by a combination of a plurality of molds, such as a core mold and a base mold, in order to allow the second rubber structure 42 having an intricate shape to be removed from the third mold 53.

The integrally-molded first rubber structure 41 and second rubber structure 42 is bonded at the interface thereof, while a cross-linking reaction between the first rubber material 43 and the second rubber material 44 has not completely proceeded. Thus, the integrally-molded first rubber structure 41 and second rubber structure 42 is heated to cause secondary vulcanization that allows the cross-linking reaction between the first rubber material 43 and the second rubber material 44 to further proceed. In this secondary vulcanization process, in an example, the integrated first rubber structure 41 and second rubber structure 42 is heated at 200° C. for three to four hours using an oven (e.g., constant temperature device). As a result, the elastic membrane 30 composed of the first rubber structure 41 and the second rubber structure 42 is completed.

FIG. 6 is a flowchart of the manufacturing method shown in FIGS. 4A to 4C and FIGS. 5A to 5B.

In step S101, as shown in FIG. 4A, the first rubber material 43 is poured into the space between the first mold 51 and the second mold 52.

In step S102, as shown in FIG. 4B, the first mold 51 and the second mold 52 are fitted to pressurize the first rubber material 43, and the first rubber material 43 is heated to mold the first rubber structure 41. Thereafter, as shown in FIG. 4C, the second mold 52 is removed.

In step S103, as shown in FIG. 5A, the second rubber material 44 is poured into the space between the first mold 51 and the third mold 53.

In step S104, as shown in FIG. 5B, the first mold 51 and the third mold 53 are fitted to pressurize the second rubber material 44, and the second rubber material 44 is heated to mold the second rubber structure 42 bonded to the first rubber structure 41, whereby the first rubber structure 41 and the second rubber structure 42 are integrally formed.

In step S105, the integrated first rubber structure 41 and second rubber structure 42 is removed from the first mold 51 and the third mold 53.

In step S106, the integrated first rubber structure 41 and second rubber structure 42 is heated to perform the secondary vulcanization that causes the cross-linking reaction to further proceed. As a result, the elastic membrane 30 composed of the first rubber structure 41 and the second rubber structure 42 is completed.

According to the present embodiment, the second rubber structure 42 bonded to the first rubber structure 41 is molded before the cross-linking reaction does not completely proceed (before the secondary vulcanization). Therefore, the first rubber structure 41 and the second rubber structure 42 can be integrated while the cross-linking reaction is proceeding. In addition, the number of processes can be reduced as compared to bonding the first rubber structure 41 and second rubber structure 42 after being separately molded. Therefore, productivity can be improved.

FIGS. 7A to 7C and FIGS. 8A to 8B are diagrams showing another example of the method of manufacturing the elastic membrane 30. In the manufacturing method shown in FIGS. 7A to 7C and FIGS. 8A to 8B, the second rubber structure 42 is first molded, then the first rubber structure 41 is molded, whereby the first rubber structure 41 and the second rubber structure 42 is integrally formed.

Figure 7A:
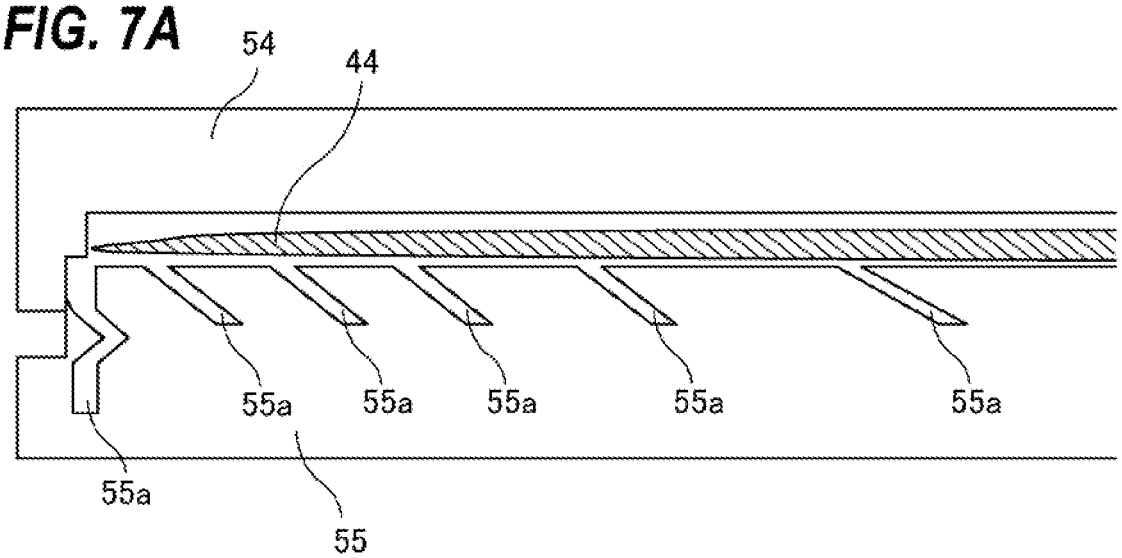
FIGS. 7A to 7C are diagrams showing another example of the method of manufacturing the elastic membrane.

First, as shown in FIG. 7A, the second rubber material 44, which is the material of the second rubber structure 42, is poured into a space between a first mold 54 and a second mold 55. The second mold 55 has recesses 55a for molding the partition walls 32 to 37 (see FIG. 3).

Figure 7B:
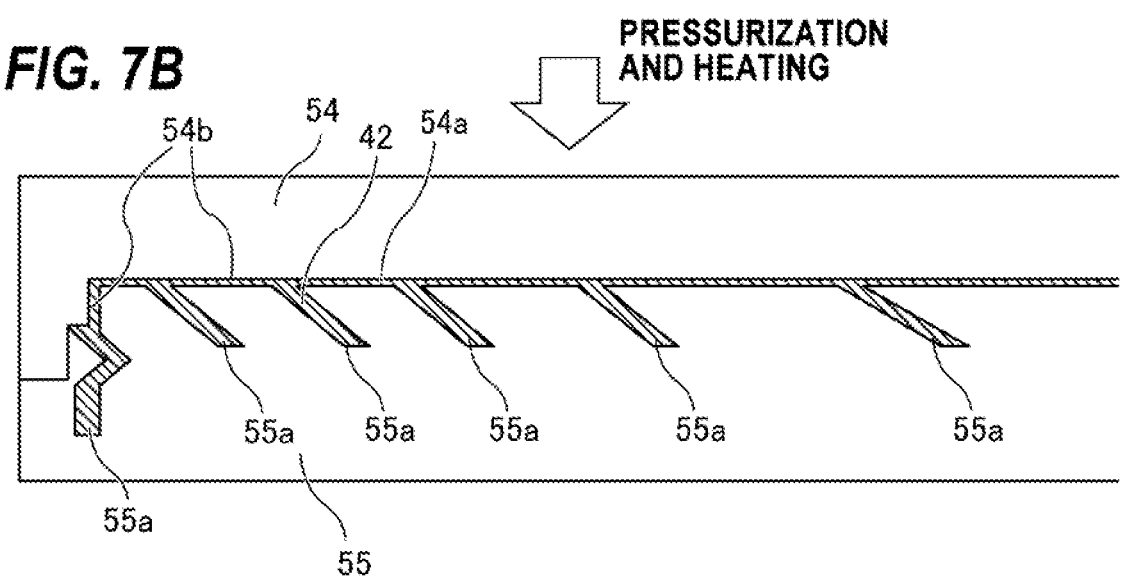

Next, as shown in FIG. 7B, the first mold 54 and the second mold 55 are fitted to pressurize the second rubber material 44, until the second rubber material 44 fills the recesses 55a of the second mold 55. When the first mold 54 and the second mold 55 are fitted, there is a gap 54a of about 0.5 mm between the first mold 54 and the second mold 55. The upper contact portion 31c (see FIG. 3) of the second rubber structure 42 is molded in this gap 54a. The second rubber material 44 is heated under pressure applied by the first mold 54 and the second mold 55, so that the second rubber structure 42 is molded.

In order to form the irregularities on the surfaces that constitute the interface between the first rubber structure 41 and the second rubber structure 42, the first mold 54 may have irregularities on a surface 54b contacting the second rubber material 44. In an example, the irregularities may be formed by a surface-roughening process, such as embossing or blasting. The irregularities of the surface 54b can form the irregularities on a surface of the upper contact portion 31c of the second rubber structure 42 and a surface of the inner wall portion 32d (see FIG. 3) of the second rubber structure 42, which are to constitute the interface with the first rubber structure 41. Since the irregularities is formed on the surface of the second rubber structure 42, the contact area between the first rubber structure 41 and the second rubber structure 42 increases, and as a result, the first rubber structure 41 and the second rubber structure 42 can be more firmly integrated.

Figure 7C:
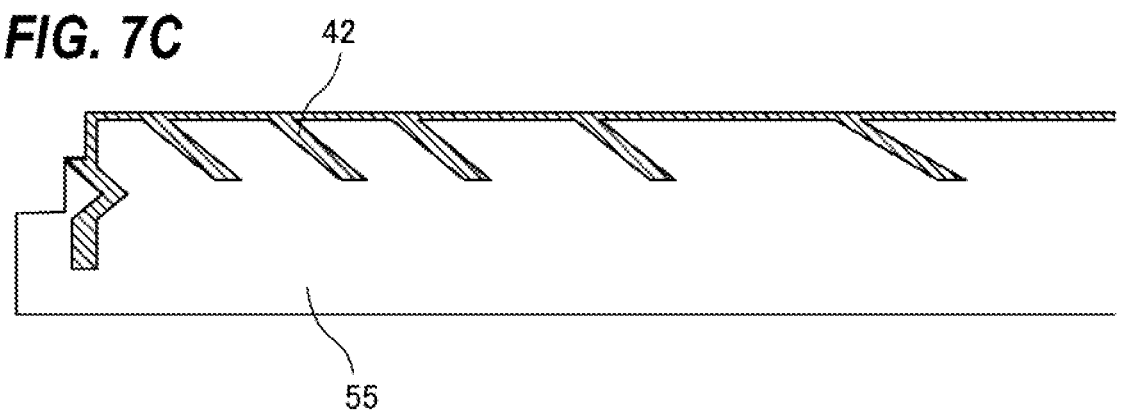
Figure 10:
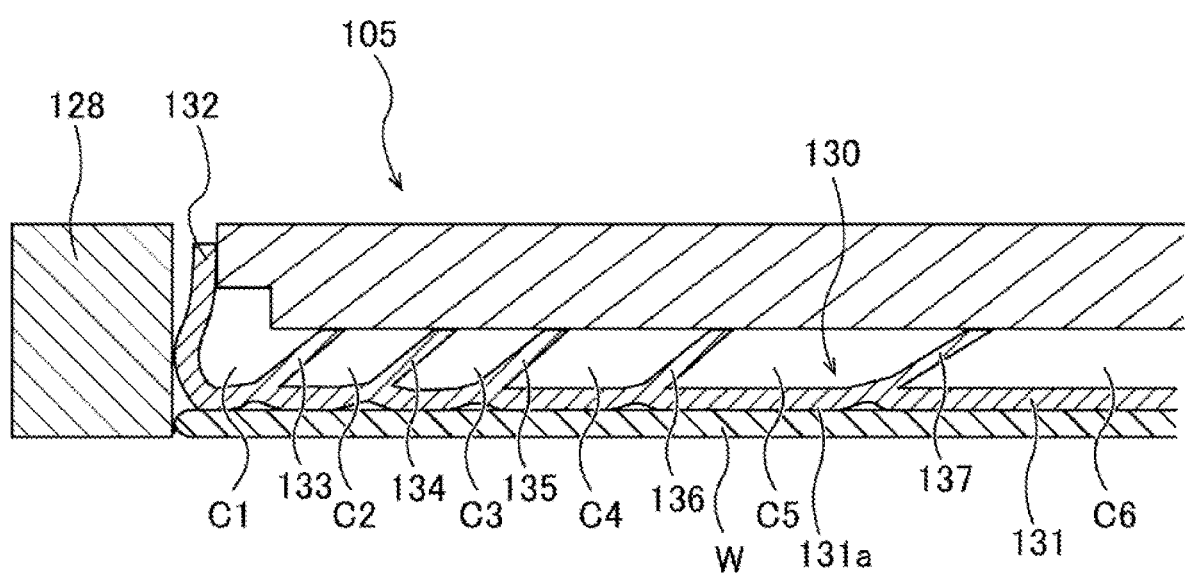
FIG. 10 is a cross-sectional view showing a part of a polishing head including an elastic membrane forming a plurality of pressure chambers.

As shown in FIG. 7C, the first mold 54 is removed while the second rubber structure 42 is held by the second mold 55. Next, a process of molding the first rubber structure 41 will be described.

As shown in FIG. 8A, the first rubber material 43, which is the material of the first rubber structure 41, is poured into a space between the second mold 55 holding the second rubber structure 42 and a third mold 56. Next, as shown in FIG. 8B, the second mold 55 and the third mold 56 are fitted to pressurize the first rubber material 43, until the first rubber material 43 fills a gap between the second mold 55 and the third mold 56. The first rubber material 43 is heated under pressure applied by the second mold 55 and the third mold 56, so that the first rubber structure 51 bonded or joined to the second rubber structure 42 is molded, whereby the first rubber structure 51 and the second rubber structure 42 are integrally formed.

Thereafter, the integrated first rubber structure 41 and second rubber structure 42 is taken out from the second mold 55 and the third mold 56. The second mold 55 may be configured by a combination of a plurality of molds, such as a core mold and a base mold, in order to allow the second rubber structure 42 having an intricate shape to be removed from the second mold 55.

The integrally-molded first rubber structure 41 and second rubber structure 42 is bonded at the interface thereof, while a cross-linking reaction between the first rubber material 43 and the second rubber material 44 has not completely proceeded. Thus, the integrally molded first rubber structure 41 and second rubber structure 42 is heated to cause secondary vulcanization that allows the cross-linking reaction between the first rubber material 43 and the second rubber material 44 to further proceed. In this process, in an example, the first rubber structure 41 and the second rubber structure 42 are heated at 200° C. for three to four hours using an oven (e.g., constant temperature device). As a result, the elastic membrane 30 composed of the first rubber structure 41 and the second rubber structure 42 is completed.

FIG. 9 is a flowchart of the manufacturing method shown in FIGS. 7A to 7C and FIGS. 8A to 8B.

In step S201, as shown in FIG. 7A, the second rubber material 44 is poured into the space between the first mold 54 and the second mold 55.

In step S202, as shown in FIG. 7B, the first mold 54 and the second mold 55 are fitted to pressurize the second rubber material 44, and the second rubber material 44 is heated to mold the second rubber structure 42. Thereafter, as shown in FIG. 7C, the first mold 54 is removed.

In step S203, as shown in FIG. 8A, the first rubber material 43 is poured into the space between the second mold 55 and the third mold 56.

In step S204, as shown in FIG. 8B, the second mold 55 and the third mold 56 are fitted to pressurize the first rubber material 43, the first rubber material 43 is heated to mold the first rubber structure 41 bonded to the second rubber structure 42, whereby the first rubber structure 41 and the second rubber structure 42 are integrally formed.

In step S205, the integrated first rubber structure 41 and second rubber structure 42 is taken out from the second mold 55 and the third mold 56.

In step S206, the integrated first rubber structure 41 and second rubber structure 42 is heated to perform the secondary vulcanization that causes the cross-linking reaction to further proceed. As a result, the elastic membrane 30 composed of the first rubber structure 41 and the second rubber structure 42 is completed.

According to the present embodiment, the first rubber structure 41 bonded to the second rubber structure 42 is molded before the cross-linking reaction does not completely proceed (before the secondary vulcanization). Therefore, the first rubber structure 41 and the second rubber structure 42 can be integrated while the cross-linking reaction is proceeding. In addition, the number of processes can be reduced as compared to bonding the first rubber structure 41 and second rubber structure 42 after being separately molded. Therefore, productivity can be improved.

In the present embodiment, the elastic membrane 30 is composed of the rubbers having two types of hardness, which are the first rubber structure 41 and the second rubber structure 42, while in one embodiment, the elastic membrane 30 may be composed of materials having three or more types of hardness. For example, the upper partition wall 32*c* of the first partition wall 32 and the second partition wall 33 to the sixth partition wall 37 may be formed of rubber structures having different hardness.

In the present embodiment, the first rubber structure 41 and the second rubber structure 42 are two types of rubber structures having different hardness, while in one embodiment, the first rubber structure 41 and the second rubber structure 42 may be rubber structures having different physical properties, such as tensile strength, elongation (or stretchability), or modulus of elasticity, other than hardness.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

What is claimed is:

1. An elastic membrane for use in a polishing head for polishing a workpiece and for pressing the workpiece against a polishing surface, comprising:
    a contact portion having a workpiece pressing surface for pressing the workpiece against the polishing surface; and
    a first partition wall extending upward from the contact portion and forming a pressure chamber,
    wherein the contact portion and at least a part of the first partition wall are composed of a first rubber structure and a second rubber structure which are integrally formed,
    the first rubber structure has a first hardness, and the second rubber structure has a second hardness lower than the first hardness,
    the first rubber structure includes the workpiece pressing surface and at least a portion of a lower portion of the first partition wall,
    the second rubber structure includes an upper portion of the first partition wall,
    the upper portion of the first partition wall has a bent portion configured to be expandable and contractible, the bent portion being folded radially inwardly to form a pleated shape, and
    the bent portion is composed of the second rubber structure and is located more upward than the first rubber structure.

2. The elastic membrane according to claim 1, wherein
    the first partition wall is connected to an outer edge of the contact portion,
    the first rubber structure includes an outer side of the lower portion of the first partition wall, and
    the second rubber structure includes an inner side of the lower portion of the first partition wall.

3. The elastic membrane according to claim 1, further comprising a second partition wall, wherein
    the first partition wall and the second partition wall form a plurality of pressure chambers,
    the first partition wall is connected to an outer edge of the contact portion,
    the second partition wall is located inwardly of the first partition wall,
    the second rubber structure includes the second partition wall.

4. The elastic membrane according to claim 1, wherein surfaces of the first rubber structure and the second rubber structure that constitute an interface between the first rubber structure and the second rubber structure have been subjected to a surface-roughening process which is embossing or blasting.

5. The elastic membrane according to claim 1, wherein the first rubber structure includes a lower contact portion, the second rubber structure includes an upper contact portion, the contact portion includes the lower contact portion and the upper contact portion which are in contact with each other.

6. The elastic membrane according to claim 5, wherein the upper contact portion is thinner than the lower contact portion.

7. The elastic membrane according to claim 5, wherein an entire lower surface of the upper contact portion is in contact with the lower contact portion.

8. The elastic membrane according to claim 5, wherein the lower contact portion has a circular shape, and the upper contact portion has a circular shape.

* * * * *